United States Patent
Ding et al.

(10) Patent No.: US 12,429,891 B1
(45) Date of Patent: Sep. 30, 2025

(54) SYSTEMS FOR ELECTRO-HYDRAULIC CONTROL OF HYDRAULIC PIPELINE RUPTURE PROTECTION BASED ON DIFFERENTIAL PRESSURE FEEDBACK

(71) Applicant: EAST CHINA JIAOTONG UNIVERSITY, Jiangxi (CN)

(72) Inventors: Ruqi Ding, Nanchang (CN); Junwei Dong, Nanchang (CN); Ling Peng, Nanchang (CN); Guohua Sun, Nanchang (CN); Wu Qin, Nanchang (CN); Gang Li, Nanchang (CN); Wei Xiao, Nanchang (CN); Congcong Xu, Nanchang (CN); Ying Liu, Jiangxi (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 19/216,688

(22) Filed: May 22, 2025

(30) Foreign Application Priority Data

May 22, 2024 (CN) .......................... 202410640180.3

(51) Int. Cl.
*G05D 16/20* (2006.01)
*F17D 5/00* (2006.01)
(Continued)

(52) U.S. Cl.
CPC ........... *G05D 16/2024* (2019.01); *F17D 5/00* (2013.01); *G05D 16/204* (2013.01); *F17D 5/02* (2013.01); *F17D 5/06* (2013.01)

(58) Field of Classification Search
CPC ..... F17D 5/02; F17D 5/00; F17D 5/06; F15B 11/08; F15B 13/0417; F15B 13/16; G05D 16/204; G05D 16/2024
See application file for complete search history.

(56) References Cited

U.S. PATENT DOCUMENTS 5,240,041 A * 8/1993 Garnjost ............. F15B 13/0438
137/625.62
8,033,107 B2 * 10/2011 Tikkanen ................ F15B 7/006
60/486
(Continued)

FOREIGN PATENT DOCUMENTS

CN 2061237 U 8/1990
CN 202733127 U 2/2013
(Continued)

OTHER PUBLICATIONS

Decision to Grant a Patent in Chinese Application No. 202410640180.3 mailed on Sep. 30, 2024, 5 pages.

*Primary Examiner* — Jessica Cahill
(74) *Attorney, Agent, or Firm* — PORUS IP LLC (57) ABSTRACT

Provided is a system for electro-hydraulic control of hydraulic pipeline rupture protection based on differential pressure feedback, which relates to the field of hydraulic control technology. The system comprises a hydraulic actuation system and a controller system. The controller system comprises a differential pressure feedback loop and a flow rate diagnostic loop. The differential pressure feedback loop is configured to obtain a flow rate signal within a hydraulic pipeline and determine a proportional signal. The flow rate diagnostic loop is configured to receive the proportional signal, and in response to determining that a duration for which the proportional signal remains outside a threshold range reaches a preset safety duration, cut off an actuating end of the hydraulic actuation system to achieve pipeline rupture protection.

8 Claims, 3 Drawing Sheets

(51) Int. Cl.
*F17D 5/02* (2006.01)
*F17D 5/06* (2006.01)

(56) References Cited

U.S. PATENT DOCUMENTS

| | | | | |
|---|---|---|---|---|
| 8,857,168 | B2* | 10/2014 | Opdenbosch | E02F 9/2296 |
| | | | | 91/437 |
| 12,297,623 | B2* | 5/2025 | Gulati | E02F 3/431 |
| 2008/0295508 | A1* | 12/2008 | Ma | G05D 16/2097 |
| | | | | 60/459 |
| 2009/0165450 | A1* | 7/2009 | Cherney | E02F 9/2203 |
| | | | | 60/484 |
| 2023/0061016 | A1* | 3/2023 | Jayaraman | H02P 27/08 |

FOREIGN PATENT DOCUMENTS

| | | | | |
|---|---|---|---|---|
| CN | 206860571 U | 1/2018 | | |
| CN | 115750511 A | 3/2023 | | |
| CN | 115788995 A | 3/2023 | | |
| EP | 0251603 A2 * | 1/1988 | ............. | F15B 13/16 |
| EP | 0482329 A1 | 4/1992 | | |
| JP | 2004060834 A | 2/2004 | | |

\* cited by examiner

SYSTEMS FOR ELECTRO-HYDRAULIC CONTROL OF HYDRAULIC PIPELINE RUPTURE PROTECTION BASED ON DIFFERENTIAL PRESSURE FEEDBACK

CROSS-REFERENCE TO RELATED APPLICATIONS

This application claims priority to Chinese Patent Application No. 202410640180.3, filed on May 22, 2024, the entire content of which is hereby incorporated by reference.

TECHNICAL FIELD

The present disclosure relates to the field of hydraulic control technology, and particularly to an electro-hydraulic control system for hydraulic pipeline rupture protection based on differential pressure feedback.

BACKGROUND

Hydraulic systems are widely used in industrial and mechanical fields to perform various tasks, such as motion control and work execution. Hydraulic systems typically include complex pipeline networks, making pipeline integrity and safety crucial for their normal operation.

To ensure pipeline integrity and safety, one of the key aspects is the timely detection and rapid protection against pipeline ruptures and leaks. Pipeline ruptures and leaks may be caused by various factors, such as prolonged use and high-frequency pressure fluctuations, external impacts or other mechanical damage leading to pipeline breakage, aging and failure of seals at joints, etc. When a pipeline leaks, it results in a drop in fluid pressure within the hydraulic system, reducing system performance. Fluid leakage may prevent the hydraulic system from providing sufficient force or speed, affecting the normal operation of actuators and shortening their service life. In cases of significant leakage, major accidents may occur, increasing the risk of injury or even fatalities. To mitigate such adverse events, methods for pipeline rupture protection have been continuously proposed, with the primary goal of rapidly detecting and taking measures in the event of a pipeline rupture or leak to minimize potential damage.

Traditional methods for pipeline rupture protection mainly rely on mechanical-hydraulic components such as a pipeline rupture valve. However, these methods can only provide protection when the pipeline rupture or leakage is substantial, making it difficult to respond to minor leaks. Additionally, traditional pipeline rupture valves rely on hardware for protection, and due to the limitations of spring stiffness, a threshold of a cutoff circuit may not be adjusted according to operational conditions after installation. As a result, the traditional pipeline rupture valves may not monitor pipeline leakage conditions. Furthermore, the traditional pipeline rupture valves suffer from non-intelligent control and an inability to automatically reset, leaving room for improvement in safety performance. On the other hand, using a flow meter to monitor pipeline conditions presents issues such as high cost, slow response, and an inability to provide real-time monitoring.

SUMMARY

The present disclosure aims to improve an existing technical problem. Therefore, the present disclosure proposes a system for electro-hydraulic control of hydraulic pipeline rupture protection based on differential pressure feedback.

A first aspect of the present disclosure provide a system for electro-hydraulic control of hydraulic pipeline rupture protection based on differential pressure feedback, comprising a hydraulic actuation system and a controller system. The controller system is electrically connected to the hydraulic actuation system and configured to control the hydraulic actuation system. The hydraulic actuation system includes a hydraulic actuator, a first electro-proportional directional valve, a second electro-proportional directional valve, an electric/generator unit, a hydraulic pump, and a relief valve.

The hydraulic actuator has a non-rod end chamber and a rod end chamber. A first pressure sensor is connected to the non-rod end chamber and configured to obtain pressure information $p_1$ of the non-rod end chamber of the hydraulic actuator. A second pressure sensor is connected to the rod end chamber and configured to obtain pressure information $p_2$ of the rod end chamber of the hydraulic actuator.

A working oil port of the first electro-proportional directional valve is connected to the non-rod end chamber, and an inlet oil port of the first electro-proportional directional valve is connected to a third pressure sensor. The third pressure sensor is configured to obtain pressure information $p_3$ of the inlet oil port of the first electro-proportional directional valve and an inlet oil port of the second electro-proportional directional valve. A working oil port of the second electro-proportional directional valve is connected to the rod end chamber, and a return oil port of the second electro-proportional directional valve is connected to a fourth pressure sensor. The fourth pressure sensor is configured to obtain pressure information $p_4$ of a return oil port of the first electro-proportional directional valve and the return oil port of the second electro-proportional directional valve. The inlet oil port of the first electro-proportional directional valve is connected to the inlet oil port of the second electro-proportional directional valve, and the return oil port of the first electro-proportional directional valve is connected to the return oil port of the second electro-proportional directional valve.

The hydraulic pump is coaxially connected to the electric/generator unit, wherein an inlet oil port of the hydraulic pump is connected to the inlet oil port of the first electro-proportional directional valve.

The relief valve is connected to an oil tank. The oil tank is connected to the return oil port of the first electro-proportional directional valve, and the relief valve is connected to a return oil port of the hydraulic pump.

In some embodiments, the controller system includes: a differential pressure feedback loop and a flow rate diagnostic loop.

The differential pressure feedback loop is electrically connected to the hydraulic actuation system and configured to obtain a flow rate signal within a hydraulic pipeline and determine a proportional signal. The flow rate signal within the hydraulic pipeline includes a first flow rate signal $q_1$ and a second flow rate signal $q_2$.

The differential pressure feedback loop is configured to: obtain, based on a first pressure signal $\Delta p_1$ and a first control signal controlling an opening degree of the first electro-proportional directional valve, a flow rate at a non-rod end chamber side of the hydraulic actuator as the first flow rate signal $q_1$.

The differential pressure feedback loop is configured to: obtain, based on a second flow rate signal $\Delta p_2$ and a second control signal controlling an opening degree of the second electro-proportional directional valve, a flow rate at a rod end chamber side of the hydraulic actuator as the second flow rate signal $q_2$.

The flow rate diagnostic loop is electrically connected to the differential pressure feedback loop and the hydraulic actuation system, respectively. The flow rate diagnostic loop is configured to: receive the proportional signal, and in response to determining that a duration for which the proportional signal remains outside a threshold range reaches a preset safety duration, cut off an actuating end of the hydraulic actuation system.

BRIEF DESCRIPTION OF THE DRAWINGS

To more clearly illustrate the technical solutions of the embodiments of the present disclosure, the accompanying drawings to be used in the description of the embodiments will be briefly described below. The accompanying drawings in the following description are only some examples or embodiments of the present disclosure, and the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

References in the drawings: 1 denotes a hydraulic actuator, 2 denotes a first pressure sensor, 3 denotes a second pressure sensor, 4 denotes a third pressure sensor, 5 denotes a fourth pressure sensor, 6 denotes a first electro-proportional directional valve, 7 denotes a second electro-proportional directional valve, 8 denotes an electric/generator unit, 9 denotes a hydraulic pump, 10 denotes a relief valve 10, and 11 denotes a controller system.

DETAILED DESCRIPTION

The embodiments of the present disclosure are described in detail below. The embodiments described with reference to the accompanying drawings are exemplary and should be understood that the specific embodiments described herein are only intended to explain the present disclosure and not to limit the scope of the present disclosure.

It should be noted that when an element is referred to as being "fixed to" another element, it may be fixed to the other element directly or fixed to the other element by an intervening element. When an element is "connected" to another element, it may be connected to the other element directly or connected to the other element by an intervening element.

Unless otherwise defined, all technical and scientific terms used herein have the same meanings as commonly understood by those skilled in the technical field of the present disclosure. The terms used in the description of the present disclosure are for the purpose of describing specific embodiments only and not intended to limit the scope of the present disclosure. The term "and/or" as used herein includes any and all combinations of one or more of the associated listed items.

In the description and claims of the present disclosure, as well as in the accompanying drawings, terms such as "first," "second," and "third" are used to distinguish different objects rather than to describe a specific order. Furthermore, the terms "comprise," "include," "have," and any variations thereof are intended to cover non-exclusive inclusion. For example, a process, a method, a system, a product, or a device that includes a series of steps or units may also optionally include steps or units not explicitly listed, or may further include other steps or units inherent to such processes, methods, products, or devices.

The accompanying drawings show only parts related to the present disclosure rather than all content. Before discussing the exemplary embodiments in greater detail, it should be noted that some exemplary embodiments are described as processes or methods depicted in flowcharts. Although the flowchart describes operations (or steps) as a sequential process, many of these operations may be performed in parallel, concurrently, or simultaneously. Additionally, the order of the operations may be rearranged. The process may terminate when its operations are completed, but it may also include additional steps not shown in the drawings. The process may correspond to a method, a function, a procedure, a subroutine, a subprogram, or the like.

The terms "component," "module," "system," "unit," or the like used in the present disclosure refer to computer-related entities, hardware, firmware, combinations of hardware and software, software, or software in execution. For example, a unit may be, but is not limited to, a process running on a processor, a processor, an object, an executable file, an execution thread, a program, and/or a distributed entity across two or more computers. Furthermore, these units may execute from various computer-readable media storing various data structures. A unit may, for example, communicate through local and/or remote processes based on signals with one or more data packets (e.g., data from a second unit interacting with a local system, distributed system, and/or network, such as the internet, which interacts with other systems via signals).

Figure 1:
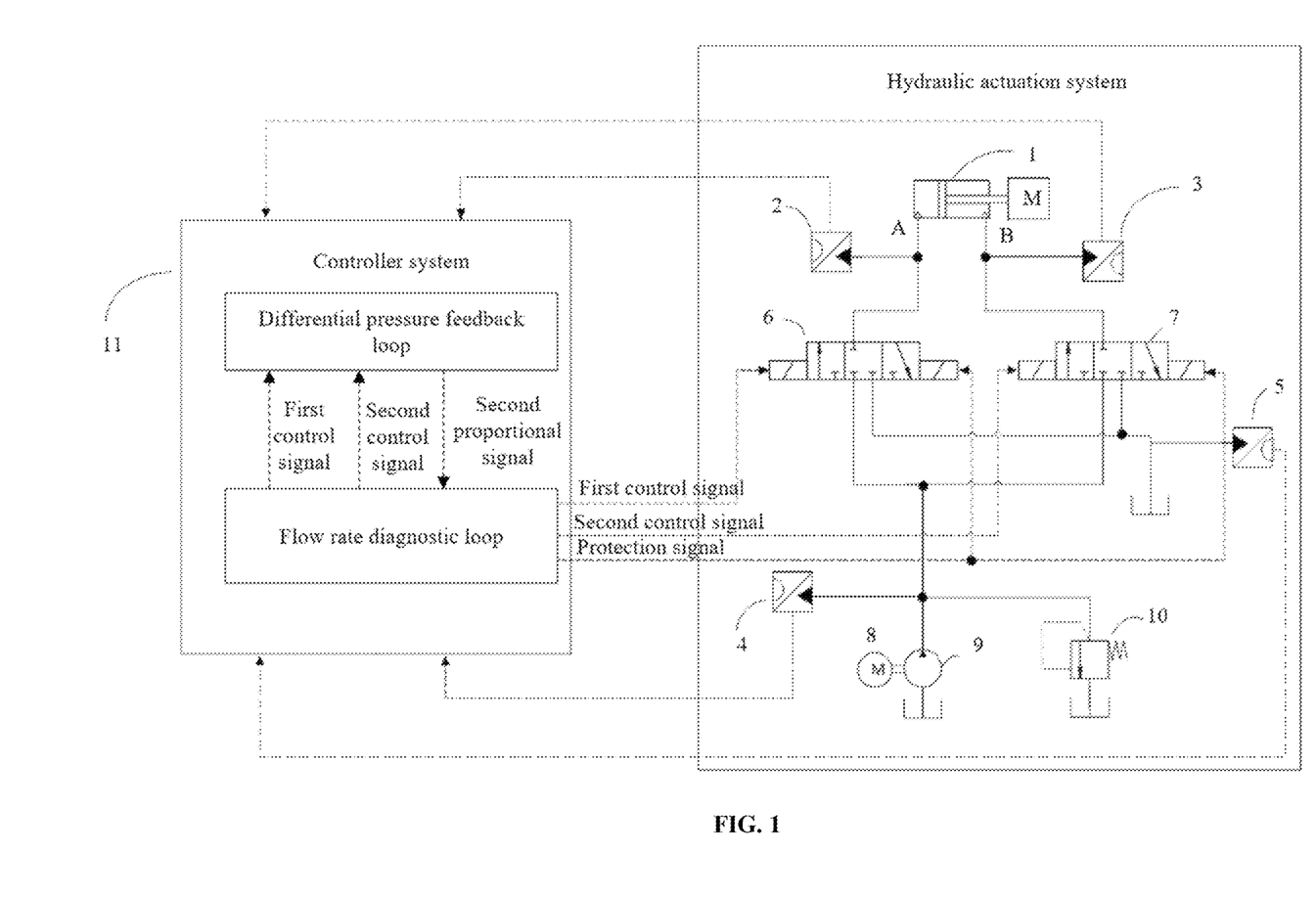
FIG. 1 is a schematic diagram of an exemplary structure of a system for electro-hydraulic control of hydraulic pipeline rupture protection based on differential pressure feedback according to some embodiments of the present disclosure.

FIG. 1 is a schematic diagram of an exemplary structure of a system for electro-hydraulic control of hydraulic pipeline rupture protection based on differential pressure feedback according to some embodiments of the present disclosure.

Figure 2:
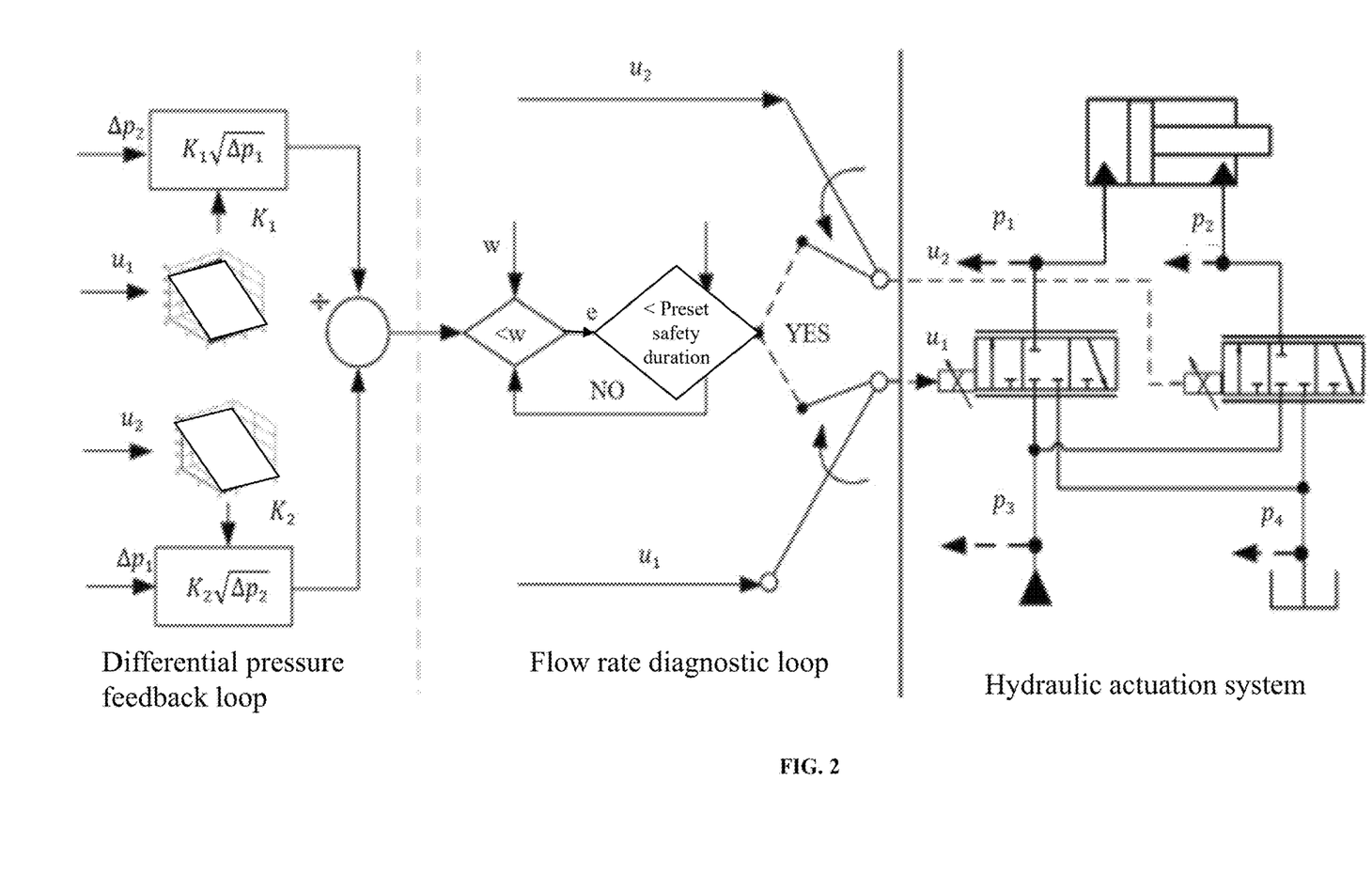
FIG. 2 is a complete control logic diagram of a system for automatic detection and protection against hydraulic pipeline ruptures through a differential pressure feedback loop and a flow rate diagnostic loop according to some embodiments of the present disclosure.

FIG. 2 is a complete control logic diagram of a system for automatic detection and protection against hydraulic pipeline ruptures through a differential pressure feedback loop and a flow rate diagnostic loop according to some embodiments of the present disclosure.

In some embodiments, the system for electro-hydraulic control of hydraulic pipeline rupture protection based on differential pressure feedback, comprising a hydraulic actuation system and a controller system. The controller system is electrically connected to the hydraulic actuation system and configured to control the hydraulic actuation system. The hydraulic actuation system includes: a hydraulic actuator, a first electro-proportional directional valve, a second electro-proportional directional valve, an electric/generator unit, a hydraulic pump, and a relief valve. The hydraulic actuator has a non-rod end chamber and a rod end chamber. A first pressure sensor is connected to the non-rod end chamber and configured to obtain pressure information $p_1$ of the non-rod end chamber of the hydraulic actuator. A second pressure sensor is connected to the rod end chamber and configured to obtain pressure information $p_2$ of the rod end chamber of the hydraulic actuator. A working oil port of the first electro-proportional directional valve is connected to the non-rod end chamber, and an inlet oil port of the first electro-proportional directional valve is connected to a third pressure sensor. The third pressure sensor is configured to obtain pressure information $p_3$ of the inlet oil port of the first electro-proportional directional valve and an inlet oil port of the second electro-proportional directional valve. A working oil port of the second electro-proportional directional valve is connected to the rod end chamber, and a return oil port of the second electro-proportional directional valve is connected to a fourth pressure sensor. The fourth pressure sensor is configured to obtain pressure information $p_4$ of a return oil port of the first electro-proportional directional valve and the return oil port of the second electro-proportional directional valve. The inlet oil port of the first electro-proportional directional valve is connected to the inlet oil port of the second electro-proportional directional valve, and the return oil port of the first electro-proportional directional valve is connected to the return oil port of the second electro-proportional directional valve. The hydraulic pump is coaxially connected to the electric/generator unit, wherein an inlet oil port of the hydraulic pump is connected to the inlet oil port of the first electro-proportional directional valve. The relief valve is connected to an oil tank. The oil tank is connected to the return oil port of the first electro-proportional directional valve, and the relief valve is connected to a return oil port of the hydraulic pump. The controller system includes: a differential pressure feedback loop and a flow rate diagnostic loop. The differential pressure feedback loop is electrically connected to the hydraulic actuation system and configured to obtain a flow rate signal within a hydraulic pipeline and determine a proportional signal. The flow rate signal within the hydraulic pipeline includes a first flow rate signal $q_1$ and a second flow rate signal $q_2$. The differential pressure feedback loop is configured to: obtain, based on a first pressure signal $\Delta p_1$ and a first control signal controlling an opening degree of the first electro-proportional directional valve, a flow rate at a non-rod end chamber side of the hydraulic actuator as the first flow rate signal $q_1$. The differential pressure feedback loop is configured to: obtain, based on a second flow rate signal $\Delta p_2$ and a second control signal controlling an opening degree of the second electro-proportional directional valve, a flow rate at a rod end chamber side of the hydraulic actuator as the second flow rate signal $q_2$. The flow rate diagnostic loop is electrically connected to the differential pressure feedback loop and the hydraulic actuation system, respectively. The flow rate diagnostic loop is configured to: receive the proportional signal, and in response to determining that a duration for which the proportional signal remains outside a threshold range reaches a preset safety duration, cut off an actuating end of the hydraulic actuation system.

In some embodiments, the differential pressure feedback loop is also configured to obtain, through the second flow rate signal $\Delta p_2$ and the second control signal controlling the opening degree of the second electro-proportional directional valve, a flow rate at the non-rod end chamber side of the hydraulic actuator as the second flow rate signal $q_2$.

Referring to FIGS. 1 and 2, the present disclosure provides system (also referred to as a hydraulic system) for electro-hydraulic control of hydraulic pipeline rupture protection based on differential pressure feedback. The hydraulic system includes a hydraulic actuation system and a controller system 11.

The controller system 11 (also referred to as a controller or an electromechanical controller) is electrically connected to the hydraulic actuation system and configured to control the hydraulic actuation system. The controller system 11 includes a differential pressure feedback loop and a flow rate diagnostic loop.

The differential pressure feedback loop is electrically connected to the hydraulic actuation system and configured to obtain a flow rate signal within a hydraulic pipeline and determine a proportional signal.

The flow rate diagnostic loop is electrically connected to the differential pressure feedback loop and the hydraulic actuation system. The flow rate diagnostic loop is configured to receive the proportional signaling, and in response to determining that a duration for which the proportional signal remains outside a threshold range reaches a preset safety duration, cut off an actuating end of the hydraulic actuation system.

The threshold range and the preset safety duration may be predefined based on prior experience.

Based on the hydraulic system in the present disclosure, the pressure sensors in the differential pressure feedback loop indirectly detects pipeline leakages. When a leakage is detected, the flow rate diagnostic loop of the controller system 11 outputs a protection signal to automatically shut off a hydraulic loop, which enables rapid response in pipeline rupture detection, making the hydraulic system suitable for hydraulic pipeline rupture protection control in unmanned monitoring scenarios.

The hydraulic actuation system refers to a set of components that drive mechanical loads using hydraulic energy. The hydraulic actuation system includes a hydraulic cylinder.

In some embodiments, the hydraulic actuation system includes: a hydraulic actuator 1, a first electro-proportional directional valve 6, a second electro-proportional directional valve 7, an electric/generator unit 8, a hydraulic pump 9, and a relief valve 10.

The hydraulic actuator 1 has a non-rod end chamber and a rod end chamber. A first pressure sensor 2 is connected to the non-rod end chamber, and configured to collect pressure information $p_1$ of the non-rod end chamber. A second pressure sensor 2 is connected to the rod end chamber, and configured to collect pressure information $p_2$ of the rod end chamber.

As shown in FIG. 1, A and B represent an inlet oil port at the non-rod end chamber side and an inlet oil port at the rod end chamber side of the hydraulic cylinder. M represents a load connected to the hydraulic cylinder. A working oil port of the first electro-proportional directional valve 6 is connected to the non-rod end chamber. An inlet oil port of the first second electro-proportional directional valve 6 is connected to a third pressure sensor, which is configured to collect pressure information $p_3$ of the inlet oil port of the first electro-proportional directional valve 6 and an inlet oil port of the second electro-proportional directional valve 7. A working oil port of the second electro-proportional directional valve 7 is connected to the rod end chamber. A return oil port of the second electro-proportional directional valve 7 is connected to a third pressure sensor 5, which is configured to collect pressure information $p_4$ of a return oil port of the first electro-proportional directional valve 6 and the return oil port of the second electro-proportional directional valve 7. The inlet oil port of the first electro-proportional directional valve 6 is connected to the inlet oil port of the second electro-proportional directional valve 7, and the return oil port of the first electro-proportional directional valve 6 is connected to the return oil port of the second electro-proportional directional valve 7.

In some embodiments, the first electro-proportional directional valve 6 and the second electro-proportional directional valve 7 are three-position, three-way solenoid valves.

The electric/generator unit 8 is a device configured to supply electrical energy to the hydraulic actuation system.

The hydraulic pump 9 is coaxially connected to the electric/generator unit 8, with an inlet port of the hydraulic pump 9 connected to the inlet port of the first electro-proportional directional valve 6.

The relief valve 10 is connected to an oil tank, which is connected to the return oil port of the first electro-proportional directional valve 6. The relief valve 10 is also connected to a return oil port of the hydraulic pump 9. By combining the first control signal $u_1$, which adjusts a spool displacement of the first electro-proportional directional valve 6, and the second control signal $u_2$, which controls a spool displacement of the second electro-proportional directional valve 7, a working mode of the hydraulic actuation system may be determined.

The flow rate signal characterizes an amount of a fluid (e.g., oil, etc.) flowing through the hydraulic pipeline. In some embodiments, the flow rate signal within the hydraulic pipeline includes a first flow rate signal $q_1$ and a second flow rate signal $q_2$.

The first flow rate signal refers to a flow rate passing through the non-rod end chamber side of the hydraulic actuator 1. The second flow rate signal refers to a flow rate passing through the rod end chamber side of the hydraulic actuator 1.

The differential pressure feedback loop obtains, based on a first pressure signal $\Delta p_1$ and the first control signal $u_1$, a flow rate on the non-rod end chamber side of the hydraulic actuator 1 as the first flow rate signal $q_1$. For example, the differential pressure feedback loop obtains the first flow rate signal based on the first pressure signal and the first control signal through a flow rate characteristic model. More descriptions regarding the flow rate characteristic model may be found elsewhere in the following present disclosure and related descriptions thereof.

The first pressure signal refers to a measured value of differential pressure levels at two valve ports of the first electro-proportional directional valve 6. The two valve ports of the first electro-proportional directional valve 6 include the inlet oil port and the working oil port of the first electro-proportional directional valve 6.

The first control signal refers to a signal for controlling an operating parameter of the first electro-proportional directional valve. For example, the first control signal may control the opening degree of the first electro-proportional directional valve, the spool displacement of the first electro-proportional directional valve, or the like. The first control signal may be predefined by a specialized technician.

The differential pressure feedback loop obtains, based on second pressure signal $\Delta p_2$ and the second control signal, a flow rate at the rod end chamber side of the hydraulic actuator 1 as the second flow rate signal $q_2$. For example, the second flow rate signal is obtained based on the second pressure signal and the second control signal through the flow rate characteristic model. More descriptions regarding the flow rate characteristic model may be found elsewhere in the following present disclosure and related descriptions thereof.

The second pressure signal refers to a measured value of differential pressure levels at two valve ports of the second electro-proportional directional valve 7.

The second control signal refers to a signal for controlling an operating parameter of the second electro-proportional directional valve. For example, the second control signal may control the opening degree of the second electro-proportional directional valve, the spool displacement of the second electro-proportional directional valve, or the like. The second control signal may be predefined by a specialized technician.

More descriptions regarding the first pressure signal, the first control signal, the second pressure signal, and the second control signal may be found in related descriptions below.

In some embodiments, the hydraulic system may further include a processor. The processor may be communicatively connected to part or all of the constituent components of the hydraulic system.

In some embodiments, the hydraulic system further includes a monitoring sensor. The processor is configured to determine a fault prediction sequence based on flow rate signals, pressure information, fluid temperature data, vibration data, operation parameters, and electrical data during a historical time period, and updates an operating parameter of the hydraulic system based on the fault prediction sequence and a growth rate threshold.

The monitoring sensor is configured to monitor parameters such as the fluid temperature data, the vibration data, the operating parameter, the electrical data, or the like of the hydraulic system. For example, the monitoring sensor includes a vibration sensor, a temperature sensor, a current sensor, a voltage sensor, or the like.

The historical time period may be predefined by a specialized technician.

Pressure information refers to measure pressure values at key nodes in the hydraulic system. For example, the pressure information includes the pressure information of the non-rod end chamber of the hydraulic actuator 1, the pressure information of the rod end chamber of the hydraulic actuator 1, the pressure information of the inlet oil port of the first electro-proportional directional valve 6 and the inlet oil port of the second electro-proportional directional valve 7, the pressure information of the return oil port of the first electro-proportional directional valve 6 and the return oil port of the second electro-proportional directional valve 7.

The fluid temperature data refers to a temperature of the fluid in the hydraulic pipeline.

The vibration data includes a vibration amplitude, a vibration frequency, and a direction of the hydraulic system along each of an X axis, a Y axis, and a Z axis. The division of the X, Y, and Z axes may be set by the hydraulic system.

The operating parameter refers to a parameter of the components of the hydraulic system. For example, the operating parameter includes the opening degree of the electro-proportional directional valve (e.g., the first electro-proportional directional valve 6 and the second electro-proportional directional valve 7), a rotational speed of the hydraulic pump, or the like.

The electrical data refers to an electrical state of the electric/generator unit. For example, the electrical data includes a current of the electric/generator unit, a voltage of the electric/generator unit, or the like.

The fault prediction sequence includes values of a predicted failure probability of the hydraulic system at preset future time points. The preset future time points may be predefined by a specialized technician.

In some embodiments, the processor may determine the fault prediction sequence based on the flow rate signals, the pressure information, the fluid temperature data, the vibration data, the operating parameters, and the electrical data during the historical time period through a fault prediction model.

The fault prediction model is a machine learning model. For example, the fault prediction model may be a Recurrent Neural Network (RNN) model, a Long Short-Term Memory (LSTM) model, etc.

In some embodiments, the fault prediction model is acquired through training based on a large number of training samples with labels. The processor may input a plurality of training samples with labels into an initial fault prediction model, construct a loss function based on the labels and an output of the initial fault prediction model. Parameters of the fault prediction model are iteratively updated based on the loss function. The iterations are ended when the loss function of the initial fault prediction model satisfies a preset condition. Then the model training is completed, and the fault prediction model is obtained. The preset condition may include that the loss function converges, a count of iterations reaches a threshold, etc.

In some embodiments, the training samples for training the fault prediction model include sample flow rate signals, sample pressure information, sample fluid temperature data, sample vibration data, sample operating parameters, and sample electrical data from the sample historical time periods at a first historical period. The labels are annotated results of whether a failure occurred in the hydraulic system at a second historical period. If a failure occurred in the hydraulic system, the label is annotated as 1; otherwise, the label is annotated as 0. The first historical period and the second historical period may be preset, with the first historical period preceding the second historical period. The training samples may be obtained based on historical data.

The growth rate threshold refers to a criterion used to determine whether an upward trend of the failure probability reaches a level requiring intervention.

In some embodiments, the growth rate threshold may be determined in a variety of ways. For example, the growth rate threshold may be predefined by a specialized technician.

In some embodiments, the growth rate threshold is also correlated to a false alarm rate.

In some embodiments, the processor determines the growth rate threshold based on the false alarm rate through a first predetermined relationship. The first predetermined relationship includes a positive correlation between the growth rate threshold and the false alarm rate.

The false alarm rate refers to a proportion of a count of incorrect fault reports to a total count of fault reports.

In some embodiments of the present disclosure, by setting the growth rate threshold positively correlated with the false alarm rate, the sensitivity of control adjustments can be dynamically optimized while ensuring safety, thereby further balancing the continuous operational efficiency of the hydraulic system.

In some embodiments, the processor decreases the opening degree of the electro-proportional directional valve and the rotational speed of the hydraulic pump in response to determining that the values of the failure probability at the preset future time points in the fault prediction sequence continuously increases and an average of growth rates is greater than the growth rate threshold.

In some embodiments of the present disclosure, determining the fault prediction sequence through the fault prediction model improves the accuracy of predicting failures in the hydraulic system. The operating parameter is updated based on the fault prediction sequence and the growth rate threshold, instead of cutting off the actuating end of the hydraulic actuation system, further safeguarding the continuous operation of the hydraulic system.

In some embodiments, the hydraulic system further includes a redundant valve and a backup oil line. The processor determines whether to control the redundant valve to switch to the backup oil line based on the fault prediction sequence and a judgment result.

The redundant valve is configured to quickly shut off a leaking hydraulic pipeline and switch to the backup oil line. For example, the redundant valve includes a solenoid shutoff valve, a three-way directional valve, or the like.

In some embodiments, the redundant valve may be installed at locations such as critical nodes (e.g., an outlet of the hydraulic pump, an inlet of the hydraulic actuator, etc.) in a main oil line and the backup oil line.

The backup oil line refers to a line that takes over hydraulic power after the main oil line is isolated.

The main oil line includes a hydraulic pipeline running from an outlet of the hydraulic pump, passing through the first electro-proportional directional valve or the second electro-proportional directional valve, and terminating at the hydraulic actuator. The backup oil line may be arranged parallel to the main oil line.

The judgment result refers to a result indicating whether or not to cut off the actuating end of the hydraulic actuation system.

In some embodiments, in response to determining that the failure probability at the preset future time points in the fault prediction sequence demonstrates sustained growth and exceeds the threshold probability at a time point, or the judgement result is yes, the processor controls the redundant valve to switch to the backup oil line.

In some embodiments of the present disclosure, by adding the redundant valve and the backup oil line, priority is given to determining whether to control the redundant valve to switch to the backup oil line, so as to maintain normal operation of the hydraulic system even in the event of a failure.

In some embodiments of the present disclosure, the differential pressure feedback loop is utilized to obtain the differential pressure at the valve ports of the electro-proportional directional valve and the control signal in real time, and the pipeline flow rate is indirectly detected through flow rate calculation equations, thereby reducing system complexity and enhancing anti-interference capability. By setting the threshold range and the preset safety duration, the hydraulic system can effectively detect and identify pipeline ruptures or leaks while avoiding false triggers or missed detections.

In some embodiments, the proportional signal within the hydraulic pipeline includes a first proportional signal $b_1$ and a second proportional signal $b_2$. The differential pressure feedback loop is configured to obtain a ratio of the first flow rate signal $q_1$ to the second flow rate signal $q_2$ as the first proportional signal $b_1$, i.e. as shown in Equation (1):

$$b_1 = \frac{q_1}{q_2}, \tag{1}$$

wherein, $b_1$ denotes the first proportional signal, $q_1$ denotes the first flow rate signal, and $q_2$ denotes the second flow rate signal.

In some embodiments, the differential pressure feedback loop is configured to obtain the second proportional signal $b_2$ by performing anomaly detection on data of the first proportional signal $b_1$ using a box plot based on the first proportional signal $b_1$, and filling deleted anomalous data and missing values based on a preset threshold. The differential pressure feedback loop is configured to transmit the second proportional signal $b_2$ within the hydraulic pipeline to the flow rate diagnostic loop.

Figure 3:
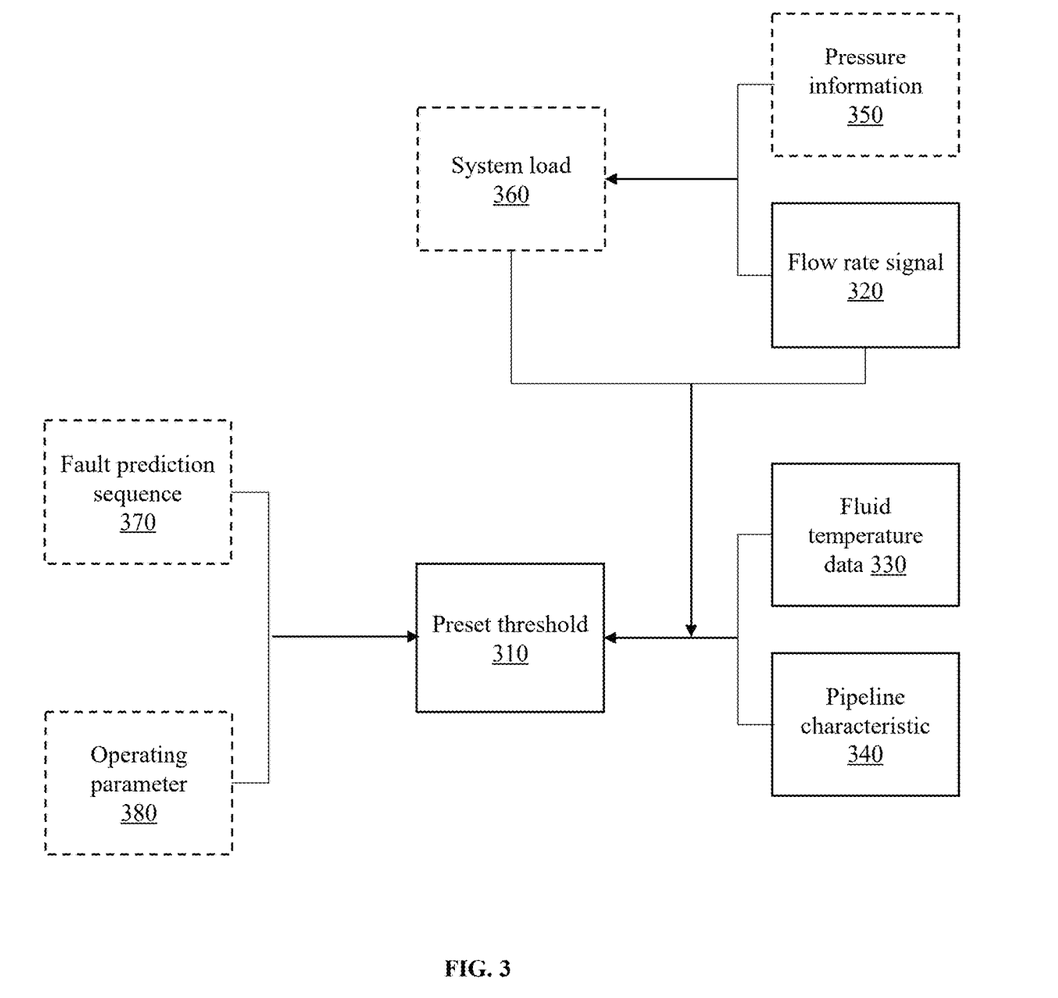
FIG. 3 is an exemplary schematic diagram illustrating the determination of a preset threshold according to some embodiments of the present disclosure.

More descriptions regarding the preset threshold (also referred to as a preset threshold w) may be found elsewhere in the present disclosure (e.g., FIG. 3 and related descriptions thereof)

The first proportional signal refers to a preliminary signal sequence characterizing a flow equilibrium state in the hydraulic pipeline. The second proportional signal refers to an anti-interference proportional signal sequence generated after applying sliding-window statistical filtering (e.g., a boxplot technique) to the first proportional signal.

The data of the first proportional signal (also referred to as data or flow data) refers to data within the first proportional signal. The data of the first proportional signal may be abbreviated as the first proportional signal.

The anomalous data (also referred to as outliers) includes signal points that deviate (e.g., sudden spikes, drops, or persistent deviations) from normal patterns in the boxplot analysis of the first proportional signal data in the box plot.

The missing values (also referred to as missing data) refer to values lost during the acquisition or transmission of the first proportional signal (e.g., null values caused by transient sensor disconnections).

The preset threshold may be determined based on prior experience.

In some embodiments, the differential pressure feedback loop performs anomaly detection based on the first proportional signal using a sliding-window boxplot analysis manner to identify and delete the anomalous data that exceeds a preset range. The missing values are then filled using the preset threshold to generate a filtered second proportional signal. Finally, the processed second proportional signal is transmitted to the flow rate diagnostic loop through a communication interface for precise determination of a rupture state of the hydraulic pipeline. The preset range may be predefined by a specialized technician.

In some embodiments of the present disclosure, calculating the dynamic equilibrium state in the hydraulic pipeline based on the differential pressure feedback loop enables rapid identification of flow imbalances caused by pipeline ruptures. When combined with boxplot-based anomaly detection of the first proportional signal, the hydraulic system effectively filters out sensor noise and interference, ensuring the authenticity and reliability of the second proportional signal obtained subsequently.

In some embodiments, to obtain the first flow rate signal $q_1$, the differential pressure feedback loop is configured to: when the first electro-proportional directional valve is in a left position, designate a pressure difference between the inlet oil port of the first electro-proportional directional valve and the working oil port of the first electro-proportional directional valve as the first pressure signal; when the first electro-proportional directional valve is in a right position, designate a pressure difference between the return oil port of the first electro-proportional directional valve and the working oil port of the first electro-proportional directional valve as the first pressure signal. The pressure difference between the return oil port of the first electro-proportional directional valve and the working oil port of the first electro-proportional directional valve is also referred to as a valve port pressure difference of the first electro-proportional directional valve. The differential pressure feedback loop is configured to obtain position information of whether the first electro-proportional directional valve is in the right position or the left position based on the first control signal, denoted as $u_1$, and obtain the first pressure signal $\Delta p_1$ using Equation (2):

$$\Delta p_1 = \begin{cases} p_1 - p_4 (u_1 > 0) \\ p_1 - p_3 (u_1 < 0) \end{cases}, \qquad (2)$$

wherein, $p_1$ denotes the pressure information of the non-rod end chamber of the hydraulic actuator 1, $p_2$ denotes the pressure information of the rod end chamber of the hydraulic actuator 1, $p_3$ denotes the pressure information of the inlet oil port of the first electro-proportional directional valve 6 and the inlet oil port of the second electro-proportional directional valve 7, and $p_4$ denotes the pressure information of the return oil port of the first electro-proportional directional valve 6 and the return oil port of the second electro-proportional directional valve 7.

In some embodiments, the differential pressure feedback loop is configured to obtain the first flow rate signal as: $q_1 = f(\Delta p_1, u_1)$ based on the first pressure signal $\Delta p_1$ and the first control signal $u_1$.

In some embodiments, a principle of indirect flow rate measurement via pressure sensors operates as follows:

The flow rate at the non-rod end chamber side of the hydraulic actuator 1 may be obtained as follows:

When a solenoid of the first electro-proportional directional valve 6 is energized, a spool of the first electro-proportional directional valve 6 undergoes a displacement under a combined action of an electromagnetic force and a spring force. Thus, proportional control of the spool displacement may be achieved based on the first control signal $u_1$. The flow rate at the non-rod end chamber side of the hydraulic actuator 1 may be calculated by establishing a flow characteristic model incorporating factors including spool displacement and valve port pressure difference, as represented by Equation (3):

$$q_1 = C_d W x_1 \sqrt{\frac{2 \Delta p_1}{\rho}}, \qquad (3)$$

wherein, $q_1$ denotes a flow rate (i.e., the first flow rate signal) through the valve port of the first electro-proportional directional valve, Ca denotes a flow coefficient, W denotes an area gradient, $x_1$ denotes the spool displacement of the first electro-proportional directional valve, $\Delta p_1$ denotes a pressure difference (i.e., the first pressure signal) between an inlet and an outlet of the first electro-proportional directional valve, and p denotes a hydraulic fluid density.

$$C_d W x_1 \sqrt{\frac{2}{\rho}}$$

is also referred to as $K_1$.

Therefore, the flow rate through the valve port of the first electro-proportional directional valve can be indirectly measured by determining the spool displacement $x_1$ of the first electro-proportional directional valve and the pressure difference Δp₁ between the inlet and the outlet of the first electro-proportional directional valve.

The left position refers to a position of the spool allowing the fluid to flow from the inlet oil port to the working oil port. The right position refers to a position of the spool allowing the fluid to flow from the working oil port to the return oil port.

In some embodiments of the present disclosure, based on the real-time position of the first electro-proportional directional valve 6, the inlet oil port or the return oil port is dynamically selected as a reference for pressure difference calculation, thereby accurately reflecting the actual pressure drop across the valve ports and avoiding flow rate estimation errors associated with conventional fixed pressure difference measurements.

To obtain the second flow rate signal $q_2$, the differential pressure feedback loop is configured to: when the second electro-proportional directional valve is in the left position, designate a pressure difference between the inlet oil port of the second electro-proportional directional valve and the working oil port of the second electro-proportional directional valve as the second pressure signal; when the second electro-proportional directional valve is in the right position, designate a pressure difference between the return oil port of the second electro-proportional directional valve and the working oil port of the second electro-proportional directional valve as the second pressure signal. The pressure difference between the inlet oil port of the second electro-proportional directional valve and the working oil port of the second electro-proportional directional valve is also referred to as a valve port pressure difference of the second electro-proportional directional valve. The differential pressure feedback loop is configured to obtain position information of whether the second electro-proportional directional valve is in the right position or the left position based on the second control signal, denoted as $u_2$, and obtain the second pressure signal $\Delta p_2$ using Equation (4):

$$\Delta p_2 = \begin{cases} p_2 - p_4 (u_2 > 0) \\ p_2 - p_3 (u_2 < 0) \end{cases}, \quad (4)$$

wherein, $p_3$ denotes the pressure information of the non-rod end chamber of the hydraulic actuator 1, $p_2$ denotes the pressure information of the rod end chamber of the hydraulic actuator 1, $p_3$ denotes the pressure information of the inlet oil port of the first electro-proportional directional valve 6 and the inlet oil port of the second electro-proportional directional valve 7, and $p_4$ denotes the pressure information of the return oil port of the first electro-proportional directional valve 6 and the return oil port of the second electro-proportional directional valve 7.

In some embodiments, the differential pressure feedback loop is configured to obtain the second flow rate signal as: $q_2 = f(\Delta p_2, u_2)$ based on the second pressure signal $\Delta p_2$ and the second control signal $u_2$.

In some embodiments, the flow rate at the rod end chamber side of the hydraulic actuator may be obtained as follows:

When a solenoid of the second electro-proportional directional valve is energized, a spool of the second electro-proportional directional undergoes a displacement under a combined action of an electromagnetic force and a spring force. Thus, proportional control of the spool displacement may be achieved based on the second control signal. The flow rate at the rod end chamber side of the hydraulic actuator may be calculated by establishing a flow characteristic model incorporating factors including spool displacement and valve port pressure difference, as represented by Equation (5):

$$q_2 = C_d W x_2 \sqrt{\frac{2 \Delta p_2}{\rho}}, \quad (5)$$

wherein $q_2$ denotes a flow rate (i.e., the second flow rate signal) through the valve port of the second electro-proportional directional valve, Ca denotes the flow coefficient, W denotes the area gradient, $x_2$ denotes the spool displacement of the second electro-proportional directional valve, $\Delta p_2$ denotes a pressure difference (i.e., the second pressure signal) between an inlet and an outlet of the second electro-proportional directional valve, and p denotes the hydraulic fluid density.

$$C_d W x_2 \sqrt{\frac{2}{\rho}}$$

is also referred to as $K_2$.

Therefore, the flow rate through the valve port of the second electro-proportional directional valve can be indirectly measured by determining the spool displacement $x_2$ of the second electro-proportional directional valve and the pressure difference $\Delta p_2$ between the inlet and the outlet of the second electro-proportional directional valve.

In some embodiments of the present disclosure, based on the real-time position of the second electro-proportional directional valve 7, the inlet oil port or the return oil port is dynamically selected as a reference for pressure difference calculation, thereby accurately reflecting the actual pressure drop across the valve ports and avoiding flow rate estimation errors associated with conventional fixed pressure difference measurements.

In some embodiments, to obtain the second proportional signal $b_2$, the differential pressure feedback loop is configured to: select a window size for partitioning a signal sequence of the first proportional signal $b_1$ into a plurality of windows, for each of the plurality of windows, arrange data in the window in an ascending order or a descending order, perform anomaly detection on outliers of flow rate data by selecting quartiles of the data in the window, after detecting the outliers of the flow rate data, fill the outliers and missing data based on a preset threshold, move the window forward by a step length, and repeat the above process until the signal sequence is completely processed, and obtain the second proportional signal $b_2$ based on a result of signal processing.

The flow rate data is the aforementioned data of the first proportional signal $b_1$.

In some embodiments, by applying a sliding window analysis technique to the signal sequence of the first proportional signal, the flow data within each window is first sorted by numerical value, and outliers are identified based on the calculated interquartile range. The detected outliers and missing data are then replaced and filled through the preset threshold. The window iteratively processes the entire signal sequence according to a set step size, ultimately outputting an anomaly-corrected second proportional signal.

In some embodiments, the selected quantile for the flow rate data may be other k-tiles instead of quartiles.

In some embodiments, the processor may perform anomaly monitoring on the anomalous data of the flow rate data by selecting k-tiles of the flow rate data, and determining a value of k in the k-tiles based on a fluctuation condition of the first proportional signal.

The fluctuation condition refers to a periodic or non-periodic change of the first proportional signal around a mean value or a desired value over a preset time period. The preset time period may be predefined by a specialized technician.

In some embodiments, the processor may determine the value of k in the k-tiles in a plurality of ways.

In some embodiments, the processor determines a distribution pattern of the first proportional signal by obtaining the first proportional signal, and determines the value of k based on the distribution pattern of the first proportional signal.

In some embodiments, the processor may acquire the first proportional signal in a plurality of ways. For example, the processor may acquire the first proportional signal directly from historical data. As another example, the processor may acquire the first proportional signal through an experiment.

The distribution pattern includes a symmetric distribution (e.g., normal distribution), a skewed distribution (e.g., exponential distribution), and a multimodal distribution.

In some embodiments, when the distribution pattern of the first proportional signal is normal, the processor may effectively characterize the first proportional signal by setting a smaller k-value (e.g., k=4). When the distribution pattern is skewed, the processor may set a larger k-value (e.g., k=10) to refine the partition of tail regions. When the distribution pattern is multimodal, the processor may increase the k-value to capture boundary points between different peaks.

In some embodiments, the processor may determine a variance of the first proportional signal and determine the fluctuation condition of the first proportional signal based on the variance. The larger the variance is, the greater the fluctuation of the first proportional signal is.

In some embodiments, the processor increases the k-value (e.g., to k=10) when the variance of the first proportional signal is relatively large to refine a quantile interval and reduce misjudgment; conversely, the processor decreases the k-value (e.g., to k=3) when the variance is relatively small to improve computational efficiency.

In some embodiments, when a system load is high and variations in the flow rate data and the pressure information become more pronounced, the processor may select a relatively large k-value to adapt to highly dynamic conditions. More descriptions regarding the system load may be found in related descriptions below.

In some embodiments, the processor may determine the k-value based on detection requirements. For example, when a high-precision detection is required (e.g., for minor leaks), the processor increases the k-value (e.g., to k=10 to 15); when a fast system response is required (e.g., in real-time systems), the processor decreases the k-value (e.g., to k=3 to 5).

In some embodiments, the k-value may also be determined based on the false alarm rate.

For example, if a current false alarm rate exceeds a false alarm rate threshold, the processor may decrease the k-value (e.g., k=3 to 5) to expand a division interval of the first proportional signal.

The false alarm rate threshold may be preset based on prior experience. More descriptions regarding the false alarm rate may be found in the related descriptions above.

In some embodiments of the present disclosure, determining the k-value based on the false alarm rate can effectively avoid subsequent misjudgment of normal flow rate data as the anomalous data.

In some embodiments of the present disclosure, the k-value is determined in a plurality of ways to optimize the adaptability of the k-value, improve the accuracy of anomaly detection and computational efficiency, and enhance the reliability and responsiveness of the hydraulic system.

In some embodiments of the present disclosure, the noise immunity and accuracy of the flow rate data are significantly improved by window statistics and quartile anomaly detection algorithms.

In some embodiments, the flow rate diagnostic loop is configured to compare the second proportional signal $b_2$ with the preset threshold w, and generate an error signal e if the second proportional signal $b_2$ exceeds the preset threshold w. To obtain the preset threshold w the flow rate diagnostic loop is further configured to:

Perform offline calibration on an acting system before an actual application to measure ratio data between the flow rate at the rod end chamber side and the flow rate at the non-rod end chamber side of a hydraulic cylinder, obtain a variance of data samples, and define three times the variance as the preset threshold w, using Equation Set (6):

$$\bar{x} = \frac{1}{n}\sum_{i=1}^{n} x_i,$$
$$\sigma = \frac{1}{n}\sum_{i=1}^{n} (x_i - \bar{x})^2,$$
$$w = \bar{x} \pm 3\sqrt{\sigma},$$
(6)

wherein $\bar{x}$ denote a mean value of data of the second proportional signal $b_2$, n denotes a data count of the second proportional signal $b_2$, and $\sigma$ denotes the variance of the data of the second proportional signal $b_2$.

The hydraulic system applies to a method for hydraulic fault diagnosis capable of detecting ruptures in any valve-equipped hydraulic control system. A system calibrated offline by the method is designated as the acting system.

The data (also referred to as data samples) of the second proportional signal refers to data generated during the offline calibration, i.e., the proportional signal obtained by calibration when the hydraulic system is not malfunctioning.

The error signal refers to an abnormal indication signal used to trigger protection actions.

More descriptions regarding the preset threshold w may be found elsewhere in the present disclosure (e.g., FIG. 3 and related descriptions thereof)

In some embodiments, in response to the second proportional signal $b_2$ exceeding the preset threshold w, the flow rate diagnostic loop generates the error signal and start timing. If the error signal disappears within the preset safety duration, the timing is stopped. If an accumulated time reaches the preset safety duration, the flow rate diagnostic loop sends a protection signal to the first electro-proportional directional valve and the second electro-proportional directional valve to force the spools of the first electro-proportional directional valve and the second electro-proportional directional valve to return to a neutral state.

In some embodiments of the present disclosure, offline calibration is performed on the acting system to obtain the ratio data between the flow rate at the non-rod end chamber side of the hydraulic cylinder and the flow rate at the rod end chamber side of the hydraulic cylinder. The mean value $\bar{x}$ and the variance $\sigma$ are obtained, and the preset threshold w is set as the mean value plus or minus three times the standard deviation. This configuration effectively covers a normal fluctuation range under standard operating conditions, ensuring a high sensitivity to actual pipeline rupture faults while significantly reducing the risk of false alarms caused by normal fluctuations, thereby enhancing the reliability of hydraulic pipeline rupture diagnosis.

In some embodiments, the flow rate diagnostic loop is configured to start timing after receiving the error signal. If the accumulated time does not reach the preset safety duration and the error signal disappears, the flow rate diagnostic loop stops the timing and restarts timing until the error signal reappears. If the accumulated time reaches the preset safety duration, the flow rate diagnostic loop transmits a protection signal to the first electro-proportional directional valve and the second electro-proportional directional valve to force the spool of the first electro-proportional directional valve and the spool of the second electro-proportional directional valve to return to the neutral state, thereby achieving protection against ruptures of the hydraulic pipeline.

In some embodiments, a timer is initiated when the error signal first appears, and the timer continues to accumulate time. If the error signal disappears before the preset safety duration is reached, the timer pauses but is not reset, and the accumulated time is retained. When the error signal reappears, the timer resumes accumulating time from the pause point.

In some embodiments, in response to the accumulated time reaching the preset safety duration, the processor forces the spool of the first electro-proportional directional valve and the spool of the second electro-proportional directional valve to return to the neutral state. In response to the accumulated time not reaching the preset safety duration, the operation of the hydraulic system is maintained.

In some embodiments, when the protection signal is transmitted, the first electro-proportional directional valve 6 and the second electro-proportional directional valve 7 may perform corresponding actions, forcing the spools to return to the neutral state, thereby enabling the automatic cutoff of the hydraulic loop upon detection of a pipeline rupture.

The neutral state refers to a reference position of the electro-proportional directional valve (e.g., the first electro-proportional directional valve 6 and the second electro-proportional directional valve 7) when no control signal is applied.

In some embodiments of the present disclosure, by forcing the spool to return to the neutral state, the hydraulic system can quickly cut off the hydraulic loop, preventing continuous leakage of the liquid in the pipeline, and effectively slowing down or avoiding pipeline ruptures. The flow rate diagnostic loop achieves timely detection of pipeline ruptures and automatic cutoff of the hydraulic loop by comparing the accumulated time of the error signal with the preset safety duration and triggering the protection signal, thereby ensuring the safety and stability of the hydraulic system.

In some embodiments, to obtain the first flow rate signal based on the first pressure signal $\Delta p_1$ and the first control signal $u_1$, the differential pressure feedback loop is configured to: determine the spool displacement of the first electro-proportional directional valve based on the first control signal $u_1$, and determine the first flow rate signal at a corresponding inlet oil port of the hydraulic actuator via the flow rate characteristic model based on the spool displacement of the first electro-proportional directional valve and the valve port pressure difference of the first electro-proportional directional valve.

In some embodiments, to obtain the second flow rate signal based on the second pressure signal $\Delta p_2$ and the second control signal $u_2$, the differential pressure feedback loop is configured to: determine the spool displacement of the second electro-proportional directional valve based on the second control signal $u_2$, and determine the second flow rate signal at a corresponding return oil port of the hydraulic actuator via the flow rate characteristic model based on the spool displacement of the second electro-proportional directional valve and the valve port pressure difference of the second electro-proportional directional valve.

In some embodiments, when the hydraulic system starts to operate, the spool of the first electro-proportional directional valve 6 and the spool of the second electro-proportional directional valve 7 are in a shut-off position. To make the hydraulic cylinder reach an extended state, the controller system transmits the first control signal to the first electro-proportional directional valve 6 the second control signal to the second electro-proportional directional valve 7, such that the spool of the first electro-proportional directional valve 6 switches to the left position and the spool of the electro-proportional directional valve 7 switches to the right position. To make the hydraulic cylinder reach a retracted state, the controller system transmits the first control signal to the first electro-proportional directional valve 6 and the second control signal to the second electro-proportional directional valve 7, so that the spool of the electro-proportional directional valve 6 switches to the right position and the spool of the second electro-proportional directional valve 7 switches to the left position, thereby enabling normal operation of the hydraulic cylinder.

In some embodiments, when the spool of the first electro-proportional directional valve 6 switches to the left position and the spool of the second electro-proportional directional valve 7 switches to the right position, the pressure difference between the inlet oil port of the first electro-proportional directional valve 6 and the working oil port of the first electro-proportional directional valve 6 is designated as the first pressure signal. The pressure difference between the return oil port of the second electro-proportional directional valve 7 and the working oil port of the second electro-proportional directional valve 7 is designated as the second pressure signal. When the spool of the first electro-proportional directional valve 6 switches to the right position and the spool of the second electro-proportional directional valve 7 switches to the left position, the pressure difference between the return oil port of the first electro-proportional directional valve 6 and the working oil port of the first electro-proportional directional valve 6 is designated as the first pressure signal, and the pressure difference between the inlet oil port of the second electro-proportional directional valve 7 and the working oil port of the second electro-proportional directional valve 7 is designated as the second pressure signal. The first electro-proportional directional valve 6 switches the position of the spool of the first electro-proportional directional valve 6 according to the received first control signal, and the second electro-proportional directional valve 7 switches the position of the spool of the first electro-proportional directional valve 6 according to the received second control signal.

In some embodiments, the flow rate diagnostic loop compares the second proportional signal $b_2$ with the preset threshold. If the second proportional signal $b_2$ exceeds the preset threshold, the error signal is generated, and timing is started. If the second proportional signal $b_2$ does not exceed the preset threshold, the timing is stopped until the second proportional signal $b_2$ exceeds the preset threshold next time, at which point the timing resumes. The time during which the error signal continuously occurs is then compared with the preset safety duration. If the time exceeds the preset safety duration, it indicates an abnormal flow condition, and the flow rate diagnostic loop triggers the protection mechanism and transmits the protection signal to the first electro-proportional directional valve 6 and the second electro-proportional directional valve 7.

When the protection signal is transmitted, the first electro-proportional directional valve 6 and the second electro-proportional directional valve 7 may execute corresponding actions to force the spools to return to the neutral state, thereby achieving automatic cut-off of the hydraulic loop when a pipeline rupture is detected. By forcing the spools to return to the neutral state, the hydraulic system can quickly cut off the hydraulic loop, preventing continuous leakage of the liquid in the pipeline, and effectively mitigating or avoiding issues that may arise from a pipeline rupture.

Therefore, by comparing the accumulated time of the error signal with the safety duration and triggering the protection signal, the flow rate diagnostic loop realizes timely detection of pipeline ruptures and automatic cut-off of the hydraulic loop, thereby ensuring the safety and stability of the hydraulic system.

In some embodiments of the present disclosure, controlling the spool displacement of the electro-proportional directional valve based on the first control signal and the second control signal enables dynamic calibration of the flow rate signal; and the accuracy of flow rate calculations can be improved by the flow rate characteristic model.

FIG. 3 is an exemplary schematic diagram illustrating the determination of a preset threshold according to some embodiments of the present disclosure.

In some embodiments, a processor may determine a preset threshold w 310 based on a flow rate signal 320, fluid temperature data 330, and a pipeline characteristic 340.

More descriptions regarding the flow rate signal and the fluid temperature data may be found elsewhere in the present disclosure (e.g., FIGS. 1-2 and related descriptions thereof)

In some embodiments, if a fluctuation condition of the flow rate signal exceeds a fluctuation threshold, it indicates unstable operation of a hydraulic system, and the processor may appropriately increase the preset threshold w to avoid false identification of pipeline rupture caused by normal fluctuations. If the fluctuation condition of the flow rate signal fluctuation is less than or equal to the fluctuation threshold, the processor may appropriately lower the preset threshold w to improve detection sensitivity. A magnitude of the increase for the preset threshold w may be predefined by a specialized technician according to actual requirements.

The fluctuation condition of the flow rate signal may be represented by a variance of a first flow rate signal and a second flow rate signal, a standard deviation of the first flow rate signal and the second flow rate signal, etc. The fluctuation threshold may be predefined by a specialized technician.

In some embodiments, the fluid temperature data has a significant effect on a viscosity level of a hydraulic fluid, thereby affecting the flow rate. The processor may determine the viscosity level of the hydraulic fluid based on the fluid temperature data. In response to determining that the viscosity level of the hydraulic fluid decreases, causing a fluctuation range of the flow rate signal to increase, the processor may appropriately increase the preset threshold w.

In some embodiments, experiments may be conducted in advance to record viscosity levels under different fluid temperature data, followed by generating a viscosity table based on experimental data. The processor determines a current viscosity level of the hydraulic fluid by referencing the viscosity table with fluid temperature data, then determines the preset threshold w based on the current viscosity level.

The pipeline characteristic refers to a characteristic related to physical properties and functions of a hydraulic pipeline. In some embodiments, the pipeline characteristic includes a material of the hydraulic pipeline, a diameter of the hydraulic pipeline, a length of the hydraulic pipeline, etc.

In some embodiments, hydraulic pipelines with different characteristics exhibit distinct flow behaviors. For example, under identical leakage conditions, a hydraulic pipeline with a relatively large diameter demonstrates relatively small flow rate variations, whereas a hydraulic pipeline with a relatively small diameter shows more pronounced flow rate variations.

In some embodiments, the processor determines the preset threshold w via a second predetermined relationship based on the pipeline characteristic. The second predetermined relationship includes a negative correlation between the diameter in the pipeline characteristic and the preset threshold w.

In some embodiments, the processor may determine a system load 360 based on pressure information 350 and the flow rate signal 320, and determines the preset threshold w 310 based on the flow rate signal 320, the fluid temperature data, the pipeline characteristic, and the system load 360.

The system load refers to an indicator characterizing a resource utilization status of the hydraulic system.

In some embodiments, when the system load increases, a pressure in the hydraulic system is elevated, and the flow rate of the hydraulic fluid in the hydraulic pipeline changes accordingly.

In some embodiments, the processor may obtain the system load by a plurality of manners. For example, based on physical principles of the hydraulic system, the pressure information, and the flow rate signal, the processor may estimate the system load by calculating a force acting on an effective working area using Equation (7):

$$\text{load} = m \times [|p_1 - p_3| \times A_1 - |p_2 - p_4| \times A_2] + c \times |q_1 - q_2| \quad (7),$$

wherein, $p_1$ denotes pressure information of a non-rod end chamber of a hydraulic actuator, $p_2$ denotes pressure information of a rod end chamber of the hydraulic actuator, $p_3$ denotes pressure information of an inlet oil port of a first electro-proportional directional valve and an inlet oil port of a second electro-proportional directional valve, $p_4$ denotes pressure information of a return oil port of the first electro-proportional directional valve and a return oil port of the second electro-proportional directional valve, $q_1$ denotes the first flow rate signal, $q_2$ denotes the second flow rate signal, m denotes a coefficient for unit consistency adjustment or compensating for other influencing factors, c denotes an adjustment coefficient reflecting the impact of flow differences on load evaluation, $A_1$ denotes an effective working area of the non-rod end chamber, and $A_2$ denotes an effective working area of the rod end chamber.

The effective working area refers to an actual effective surface area where liquid pressure acts on the piston or plunger to generate force in the hydraulic system. In some embodiments, the effective working area may be obtained by actual measurements by a technician.

In some embodiments, the processor may determine the values of m and c by fitting based on at least one of extensive experimental and historical data. The processor may obtain the values of $A_1$ and $A_2$ by prior measurements.

In some embodiments, flow rate data and pressure data may include anomalous data due to leakages, and the processor may preliminarily use an anomalous data detection technique to detect and delete the anomalous data. The anomalous data detection technique includes an Isolation Forest technique, a Local Outlier Factor (LOF) technique, a boxplot technique, etc.

In some embodiments, the processor may construct a feature vector based on the fluctuation condition of the flow rate signal, the fluid temperature data, the pipeline characteristic, and the system load. Then, based on the feature vector, a search is performed in a vector database to determine the preset threshold w.

The vector database refers to a database for determining the preset threshold w. In some embodiments, the vector database includes a plurality of reference vectors and their corresponding reference preset thresholds w.

In some embodiments, experiments may first be conducted under different implementation conditions (e.g., different leakage conditions, different load conditions, and different fluid temperature data), where fluctuation conditions of flow rate signals, fluid temperature data, pipeline characteristics, and system loads are recorded as reference vectors. The second proportional signals $b_2$ corresponding to leakages at a current experimental condition are recorded. In some embodiments, the processor may designate an average value of the second proportional signals $b_2$ as the reference preset threshold.

In some embodiments, the processor may store a plurality of the reference vectors and their corresponding reference preset thresholds w into the vector database (e.g., Milvus, Faiss, etc.).

In some embodiments, the processor may determine a similarity between the feature vector and each of the reference vectors, and determine the preset threshold w corresponding to the feature vector. For example, a reference vector whose similarity with the feature vectors satisfies a preset condition is taken as a target vector, and the reference preset threshold w corresponding to the target vector is designated as the preset threshold w corresponding to the feature vector. The preset condition may be determined according to requirements. For example, the preset condition may be that the similarity is greater than a preset similarity threshold, etc. The similarity between a reference vector and the feature vector may be negatively correlated to a vector distance between the reference vector and the feature vector. For example, the vector distance may be determined based on a cosine distance, etc. For example, the similarity may be the reciprocal of the vector distance.

In some embodiments of the present disclosure, the processor is configured to determine the preset threshold w based on a comprehensive analysis of the flow rate signal, the fluid temperature data, the pipeline characteristic, and the system load, thereby enhancing the sensitivity and reliability of rupture detection and effectively avoiding false triggering or missed detection associated with traditional fixed thresholds.

In some embodiments, the processor may determine the preset threshold w 310 based on a fault prediction sequence 370 and an operating parameter 380.

More descriptions regarding the fault prediction sequence and the operating parameter may be found elsewhere in the present disclosure (e.g., FIGS. 1-2 and related descriptions thereof)

In some embodiments, when at least one of a maximum value and an average value in the fault prediction sequence is greater than a detection threshold, the processor may decrease the preset threshold w. A magnitude of the decrease may be negatively correlated to the at least one of the maximum value and the average value in the fault prediction sequence. The detection threshold may be preset based on prior experience.

In some embodiments, when the operating parameter indicates a reduced opening degree of the electro-proportional directional valve and a decreased flow rate of the hydraulic fluid in the hydraulic pipeline, the processor may appropriately decrease the preset threshold w to enhance sensitivity for detecting minor leaks in the hydraulic system.

In some embodiments of the present disclosure, determining the preset threshold based on the system load and the fault prediction sequence improves anomaly detection sensitivity, enables early fault warnings, and effectively mitigates pipeline burst risks caused by high-pressure hydraulic shocks.

The present disclosure has the following technical effects:

1. The hydraulic system utilizes the pressure sensors (e.g., the first pressure sensor and the second pressure sensor) and the controller system to achieve automatic leakage detection and protection, making it particularly suitable for unmanned hydraulic pipeline monitoring scenarios.

2. The hydraulic system utilizes the pressure sensors for indirect flow rate measurements, thereby effectively circumventing the slow response and high costs associated with flowmeter-based solutions. With strong adaptability, the control methodology of the hydraulic system can be implemented in any hydraulic valve-equipped pipeline protection system.

3. The electromechanical controller of the hydraulic system dynamically adjusts loop interruption timing based on operational conditions, eliminating the need for manual valve replacement during operational condition adjustments while preventing false negatives (i.e., failure to detect actual ruptures) and false positives (i.e., erroneous rupture alarms). The hydraulic system offers both economic efficiency and operational convenience.

4. After repairing the pipeline, the electro-proportional directional valve (e.g., the first electro-proportional directional valve and the second electro-proportional directional valve) can be automatically reset based on the control signal (e.g., the first control signal and the second control signal), thereby enhancing operational efficiency through rapid response and minimized downtime.

In the description of the present disclosure, directional terms (e.g., "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," "circumferential") refer to orientations depicted in the accompanying drawings. These terms simplify description and do not mandate that components must maintain specific configurations or operate in designated orientations. Such references should not be construed as limiting the scope of the present disclosure.

In the description of the present disclosure, reference is made to the terms "an embodiment", "some embodiments", "exemplary embodiment", "example", "specific example", or "some examples", etc., are used in the description to mean the specific features, structures, materials, or characteristics described in connection with the embodiment or example are included in at least one embodiment or example of the present disclosure. In the present disclosure, schematic representations of the above terms do not necessarily refer to the same embodiments or examples.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure, or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A system for electro-hydraulic control of hydraulic pipeline rupture protection based on differential pressure feedback, comprising a hydraulic actuation system and a controller system, wherein the controller system is electrically connected to the hydraulic actuation system and configured to control the hydraulic actuation system, the hydraulic actuation system comprises:
  a hydraulic actuator having a non-rod end chamber and a rod end chamber, wherein a first pressure sensor is connected to the non-rod end chamber, and a second pressure sensor is connected to the rod end chamber;
  a first electro-proportional directional valve and a second electro-proportional directional valve, wherein a working oil port of the first electro-proportional directional valve is connected to the non-rod end chamber, an inlet oil port of the second electro-proportional directional valve is connected to a third pressure sensor, a working oil port of the second electro-proportional directional valve is connected to the rod end chamber, a return oil port of the second electro-proportional directional valve is connected to a fourth pressure sensor, an inlet oil port of the first electro-proportional directional valve is connected to the inlet oil port of the second electro-proportional directional valve, and a return oil port of the first electro-proportional directional valve is connected to the return oil port of the second electro-proportional directional valve;
  an electric/generator unit;
  a hydraulic pump coaxially connected to the electric/generator unit, wherein an inlet oil port of the hydraulic pump is connected to the inlet oil port of the first electro-proportional directional valve;
  a relief valve connected to an oil tank, wherein the oil tank is connected to the return oil port of the first electro-proportional directional valve, and the relief valve is connected to a return oil port of the hydraulic pump;

the controller system comprises:
  a differential pressure feedback loop electrically connected to the hydraulic actuation system and configured to obtain a flow rate signal within a hydraulic pipeline and determine a proportional signal, wherein the flow rate signal within the hydraulic pipeline includes a first flow rate signal $q_1$ and a second flow rate signal $q_2$, and the differential pressure feedback loop is configured to:
    obtain, based on a first pressure signal $\Delta p_1$ and a first control signal controlling an opening degree of the first electro-proportional directional valve, a flow rate at a non-rod end chamber side of the hydraulic actuator as the first flow rate signal $q_1$;

obtain, based on a second pressure signal $\Delta p_2$ and a second control signal controlling an opening degree of the second electro-proportional directional valve, a flow rate at the non-rod end chamber side of the hydraulic actuator as the second flow rate signal $q_2$; and a flow rate diagnostic loop electrically connected to the differential pressure feedback loop and the hydraulic actuation system, respectively, and configured to:
receive the proportional signal, and
in response to determining that a duration for which the proportional signal remains outside a threshold range reaches a preset safety duration, cut off an actuating end of the hydraulic actuation system.

2. The system of claim 1, wherein the proportional signal within the hydraulic pipeline includes a first proportional signal $b_1$ and a second proportional signal $b_2$, and the differential pressure feedback loop is configured to:

obtain a ratio of the first flow rate signal $q_1$ to the second flow rate signal $q_2$ as the first proportional signal $b_1$, i.e.

$$b_1 = \frac{q_1}{q_2};$$

obtain the second proportional signal $b_2$ by performing anomaly detection on data of the first proportional signal by using a box plot based on the first proportional signal $b_1$, and filling deleted anomalous data and missing values based on a preset threshold; and transmits the second proportional signal $b_2$ within the hydraulic pipeline to the flow rate diagnostic loop.

3. The system of claim 2, wherein to obtain the second proportional signal $b_2$, the differential pressure feedback loop is configured to:

select a window size for partitioning a signal sequence of the first proportional signal $b_1$ into a plurality of windows, for each of the plurality of windows,
arrange data in the window in an ascending order or a descending order,
perform anomaly detection on outliers of flow rate data by selecting quartiles of the data in the window,
after detecting the outliers of the flow rate data, fill the outliers and missing data based on a preset threshold, and
move the window forward by a step length, and repeat the above process until the signal sequence is completely processed, and obtain the second proportional signal $b_2$ based on a result of signal processing.

4. The system of claim 1, wherein to obtain the first flow rate signal $q_1$, the differential pressure feedback loop is configured to:

when the first electro-proportional directional valve is in a left position, designate a pressure difference between the inlet oil port of the first electro-proportional directional valve and the working oil port of the first electro-proportional directional valve as the first pressure signal;

when the first electro-proportional directional valve is in a right position, designate a pressure difference between the return oil port of the first electro-proportional directional valve and the working oil port of the first electro-proportional directional valve as the first pressure signal;

obtain position information of whether the first electro-proportional directional valve is in the right position or the left position through the first control signal, denoted as $u_1$;

obtain the first pressure signal $\Delta p_1$ using the following equation:

$$\Delta p_1 = \begin{cases} p_1 - p_4 (u_1 > 0) \\ p_1 - p_3 (u_1 < 0) \end{cases},$$

wherein $p_1$ denotes pressure information of the non-rod end chamber of the hydraulic actuator, $p_2$ denotes pressure information of the rod end chamber of the hydraulic actuator, $p_3$ denotes pressure information of the inlet oil port of the first electro-proportional directional valve and the inlet oil port of the second electro-proportional directional valve, and $p_4$ denotes pressure information of the return oil port of the first electro-proportional directional valve and the return oil port of the second electro-proportional directional valve;

obtain the first flow rate signal as: $q_1 = f(\Delta p_1, u_1)$ based on the first pressure signal $\Delta p_1$ and the first control signal $u_1$.

5. The system of claim 4, wherein the flow rate diagnostic loop is configured to:

start timing after receiving an error signal;
in response to determining that an accumulated time does not reach the preset safety duration and the error signal disappears, stop the timing, and restart timing until the error signal reappears; and
in response to determining that the accumulated time reaches the preset safety duration, transmit a protection signal to the first electro-proportional directional valve and the second electro-proportional directional valve to force a spool of the first electro-proportional directional valve and a spool of the second electro-proportional directional valve to return to a neutral state.

6. The system of claim 4, wherein to obtain the first flow rate signal $q_1$ based on the first pressure signal $\Delta p_1$ and the first control signal $u_1$, the differential pressure feedback loop is configured to:
determine a spool displacement of the first electro-proportional directional valve based on the first control signal $u_1$;
determine the first flow rate signal at a corresponding inlet oil port of the hydraulic actuator via a flow rate characteristic model based on the spool displacement of the first electro-proportional directional valve and a valve port pressure difference of the first electro-proportional directional valve;

to obtain the second flow rate signal $q_2$ based on the second pressure signal $\Delta p_2$ and the second control signal $u_2$, the differential pressure feedback loop is configured to:
determine a spool displacement of the second electro-proportional directional valve based on the second control signal $u_2$;
determine the second flow rate signal at a corresponding return oil port of the hydraulic actuator via the flow rate characteristic model based on the spool displacement of the second electro-proportional directional valve and a valve port pressure difference of the second electro-proportional directional valve.

7. The system of claim 1, wherein to obtain the second flow rate signal $q_2$, the differential pressure feedback loop is configured to:

when the second electro-proportional directional valve is in a left position, designate a pressure difference between the inlet oil port of the second electro-proportional directional valve and the working oil port of the second electro-proportional directional valve as the second pressure signal;

when the second electro-proportional directional valve is in a right position, designate a pressure difference between the return oil port of the second electro-proportional directional valve and the working oil port of the second electro-proportional directional valve as the second pressure signal;

obtain position information of whether the second electro-proportional directional valve is in the right position or the left position through the second control signal, denoted as $u_2$;

obtain the second pressure signal $\Delta p_2$ using the following equation:

$$\Delta p_2 = \begin{cases} p_2 - p_4 (u_2 > 0) \\ p_2 - p_3 (u_2 < 0) \end{cases},$$

wherein $p_1$ denotes pressure information of the non-rod end chamber of the hydraulic actuator, $p_2$ denotes pressure information of the rod end chamber of the hydraulic actuator, $p_3$ denotes pressure information of the inlet oil port of the first electro-proportional directional valve and the inlet oil port of the second electro-proportional directional valve, and $p_4$ denotes pressure information of the return oil port of the first electro-proportional directional valve and the return oil port of the second electro-proportional directional valve;

obtain, based on the second pressure signal $\Delta p_2$ and the second control signal $u_2$, the second flow rate signal as: $q_2 = f(\Delta p_2, u_2)$.

8. The system of claim 1, wherein
the flow rate diagnostic loop is configured to:
compare the second proportional signal $b_2$ with a preset threshold w, and
generate an error signal if the second proportional signal $b_2$ exceeds the preset threshold w;
to obtain the preset threshold w, the flow rate diagnostic loop is further configured to:
perform offline calibration on an acting system before an actual application to measure ratio data between the flow rate at a rod end chamber side of a hydraulic cylinder and the flow rate at the non-rod end chamber side of the hydraulic cylinder,
obtain a variance of data samples, and
define three times the variance as the preset threshold w, using the following equations:

$$\bar{x} = \frac{1}{n} \sum_{i=1}^{n} x_i,$$

$$\sigma = \frac{1}{n} \sum_{i=1}^{n} (x_i - \bar{x})^2,$$

$$w = \bar{x} \pm 3\sqrt{\sigma},$$

wherein $\bar{x}$ denote a mean value of data of the second proportional signal $b_2$, n denotes a data count of the second proportional signal $b_2$, and $\sigma$ denotes the variance of the data of the second proportional signal $b_2$.

* * * * *